2,712,019
PROCESS OF PREPARING 4-ALKYL PYRIDINES

Leon E. Tenenbaum, Brooklyn, and Theodore I. Fand, White Plains, N. Y., assignors to Nepera Chemical Co., Inc., Nepera Park, Yonkers, N. Y., a corporation of New York No Drawing. Application July 16, 1952, Serial No. 299,226

13 Claims. (Cl. 260—290)

This invention relates to the preparation of alkyl-substituted pyridine base compounds and relates more particularly to an improved process for the production of alkyl pyridine compounds containing an alkyl group substituted in 4-position.

Methods for the production of pyridine base compounds containing a 4-alkyl group are well known. These compounds may be readily obtained by reacting a pyridine base compound having a free 4-position, and containing no reactive substituents, with an aliphatic acid anhydride or aliphatic acid chloride in the presence of zinc dust. The reaction is usually carried out by mixing the pyridine base compound with the desired aliphatic acid anhydride and then very gradually adding zinc dust to the mixture. When the addition is complete, the mixture is diluted by the addition of aliphatic acid. The reaction mixture is then heated and a further portionwise addition of zinc dust is made. After the reaction mixture is allowed to cool, water is added and the diluted mixture then made alkaline with sodium hydroxide. By subjecting the alkaline mixture to a steam distillation, the free pyridine bases are taken off and the 4-alkyl pyridine compound may then be separated from the steam-distilled mixture of pyridine bases by fractional distillation. Thus, for example, a 4-alkyl group may be readily introduced into pyridine base compounds such as pyridine, beta-picoline, 3-ethyl pyridine, quinoline, and alkyl-substituted quinolines. By reacting a pyridine base compound with acetic anhydride, a 4-ethyl group is introduced, with propionic anhydride a 4-propyl group is introduced, with butyric anhydride a butyl group is introduced, etc. The reaction has also been carried out successfully with isobutyric anhydride, valeric anhydride and isovaleric anhydride as well as caprylic anhydride and the corresponding alkyl groups have been introduced into the free 4-position of the pyridine base compound with which said anhydrides have been reacted. While the use of zinc dust is satisfactory in this reaction when the latter is carried out on a relatively small scale, the use of this reactant is not at all satisfactory on a large, commercial scale since it produces a rather violent reaction which is exceedingly difficult to control.

It is, therefore, an important object of this invention to provide an improved process for the production of pyridine base compounds containing a 4-alkyl substituent.

Another object of this invention is the production of 4-alkyl substituted pyridine base compounds on a commercial scale by reaction of a pyridine base compound with an aliphatic acid anhydride whereby the reaction may be suitably controlled.

Other objects of this invention will appear from the following detailed description.

We have now found that the reaction involving the introduction of a 4-alkyl group into a pyridine base compound by reacting said pyridine base compound with an aliphatic acid anhydride or acid chloride, as described above, may be readily controlled if said reaction is carried out by mixing the desired reactants in the usual manner and then adding finely-divided iron thereto. In accordance with our novel process, the temperature of the reaction mixture may be maintained at from 25° to 100° C. during the addition of the finely-divided iron without any undue violence or any danger of loss of control of the reaction.

We have also found that it is highly advantageous to effect the dilution of the reaction mixture with the corresponding aliphatic acid, in the manner described above, followed by the addition of further amounts of finely-divided iron without permitting any intermediate cooling to take place. Since the use of finely-divided iron yields an easily controllable reaction, careful external temperature control and intermediate cooling during the course of the reaction is unnecessary. When dilution with the acid has been effected and the addition of all of the finely-divided iron has been completed, the reaction mixture is refluxed for from 1 to 2 hours. Preferably, the finely-divided iron is employed, in carrying out our novel process in an amount of from 2 to 3 mols for each mol of pyridine base compound undergoing reaction and optimum results are obtained when about 2 mols of finely-divided iron are employed for each mol of pyridine base compound. In adding the finely-divided iron, preferably the first addition may comprise from 1.2 to 1.5 mols of finely-divided iron for each mol of the pyridine base compound present, while the second addition is preferably from 0.8 to 1.5 mols, thus making the total addition from 2 to 3 mols for each mol of pyridine base compound undergoing reaction. The acid anhydride is preferably employed in an amount of 5 to 8 mols for each mol of the pyridine base compound employed.

In order further to illustrate our invention, but without being limited thereto, the following examples are given:

Example I 200 parts by weight of pyridine are mixed with 648 parts by weight of acetic anhydride and then 168 parts by weight of finely-divided iron (200 mesh) are gradually added over the course of 1.5 hours with vigorous stirring, the addition being made at a controlled rate so as to maintain the reaction temperature at 70 to 80° C. When the addition of the finely-divided iron is complete, about 210 parts by weight of acetic acid are added directly without any cooling of the reaction mixture, followed by the further addition of 103 parts by weight of finely-divided iron. The second addition of iron is made with vigorous stirring over the course of a 2-hour period and at a controlled rate, so as to maintain the reaction temperature at 70 to 80° C. When the second addition of finely-divided iron is completed, the entire reaction mixture is heated under reflux for one hour. The hot reaction mixture is then cooled to a temperature of about 20° C. and made strongly alkaline by the addition of a 50% by weight aqueous solution of sodium hydroxide. The alkaline mixture is steam distilled to separate the 4-ethyl pyridine formed as well as the unreacted pyridine present. On fractional distillation, 4-ethyl pyridine is obtained.

Example II 169 parts by weight of iron powder are added slowly and portion wise over a 1.5-hour period to a solution of 200 parts by weight of pyridine and 730 parts by weight of propionic anhydride, the temperature of the reaction mixture being kept between 60 and 70° C. After final addition, the mixture is stirred for 15 minutes and 242 parts by weight of propionic acid are added. The temperature is raised to 70° C. and 103 parts by weight of iron powder are added slowly and portionwise, keeping the temperature between 70 and 80° C. After the final addition, the mixture is refluxed for one-half hour at 140° C. The reaction mixture is cooled and made strongly alkaline with a 50% aqueous solution of sodium hydroxide. The mixture is then steam distilled. The basic fraction is separated and 4-propyl-pyridine is then obtained by further fractional distillation.

It is to be understood that the foregoing detailed description is given merely by way of illustration and that many variations may be made therein without departing from the spirit of our invention.

Having described our invention, what we desire to secure by Letters Patent is:

1. In a process for the production of a 4-alkyl pyridine by reacting pyridine with a member of the group consisting of saturated aliphatic acid anhyrides and saturated aliphatic acid chlorides, the step which comprises carrying out said reaction in the presence of iron.

2. Process for the production of a 4-alkyl substituted pyridine, which comprises forming a reaction mixture comprising pyridine and a member of the group consisting of saturated aliphatic acid anhydrides and saturated aliphatic acid chlorides, adding finely-divided iron to the reaction mixture, diluting the reaction mixture with a saturated aliphatic acid, adding an additional amount of finely-divided iron to the diluted mixture, refluxing the resulting reaction mixture, rendering the reaction mixture alkaline, and separating a 4-alkyl substituted pyridine from the alkaline mixture.

3. Process for the production of a 4-alkyl substituted pyridine, which comprises forming a reaction mixture comprising pyridine and a saturated aliphatic acid anhydride, adding from 1.2 to 1.5 mols of finely-divided iron to the reaction mixture for each mol of pyridine, diluting the reaction mixture with a saturated aliphatic acid, adding an additional amount of from 0.8 to 1.5 mols of finely-divided iron to the diluted mixture for each mol of pyridine, refluxing the resulting reaction mixture, rendering the reaction mixture alkaline, and separating a 4-alkyl substituted pyridine from the alkaline mixture.

4. Process for the production of a 4-alkyl substituted pyridine, which comprises forming a reaction mixture comprising pyridine and a saturated aliphatic acid anhydride, adding from 1.2 to 1.5 mols of finely-divided iron to the reaction mixture for each mol of pyridine while maintaining the reaction mixture at 25 to 100° C., diluting the reaction mixture with a saturated aliphatic acid, adding an additional amount of from 0.8 to 1.5 mols of finely-divided iron to the diluted mixture for each mol of pyridine, while maintaining the mixture at 25 to 100° C., refluxing the resulting reaction mixture, rendering the reaction mixture alkaline, and separating a 4-alkyl substituted pyridine from the alkaline mixture by steam distilling the alkaline mixture whereby the pyridine compounds are removed, and then fractionating the pyridine compounds to separate a 4-alkyl substituted pyridine.

5. Process for the production of a 4-ethyl pyridine, which comprises forming a reaction mixture comprising a pyridine compound and acetic anhydride, adding finely-divided iron to the reaction mixture, diluting the reaction mixture with acetic acid, adding an additional amount of finely-divided iron to the diluted mixture, refluxing the resulting mixture, rendering the reaction mixture alkaline, and separating a 4-ethyl substituted pyridine from the alkaline mixture.

6. Process for the production of a 4-propyl pyridine, which comprises forming a reaction mixture comprising a pyridine compound and propionic anhydride, adding finely-divided iron to the reaction mixture, diluting the reaction mixture with propionic acid, adding an additional amount of finely-divided iron to the diluted mixture, refluxing the resulting mixture, rendering the reaction mixture alkaline, and separating a 4-propyl substituted pyridine from the alkaline mixture.

7. Process for the production of 4-butyl pyridine, which comprises forming a reaction mixture comprising pyridine and butyric anhydride, adding finely-divided iron to the reaction mixture, diluting the reaction mixture with acetic acid, adding an additional amount of finely-divided iron to the diluted mixture, refluxing the resulting mixture, rendering the reaction mixture alkaline, and separating 4-butyl pyridine from the alkaline mixture.

8. Process for the production of 4-amyl pyridine, which comprises forming a reaction mixture comprising pyridine and valeric anhydride, adding finely-divided iron to the reaction mixture, diluting the reaction mixture with acetic acid, adding an additional amount of finely-divided iron to the diluted mixture, refluxing the resulting mixture, rendering the reaction mixture alkaline, and separating 4-amyl pyridine from the alkaline mixture.

9. Process for the production of 4-octyl pyridine, which comprises forming a reaction mixture comprising pyridine and caprylic anhydride adding finely-divided iron to the reaction mixture, diluting the reaction mixture with acetic acid, adding an additional amount of finely-divided iron to the diluted mixture, refluxing the resulting mixture, rendering the reaction mixture alkaline, and separating 4-octyl pyridine from the alkaline mixture.

10. Process for the production of 4-isobutyl pyridine, which comprises forming a reaction mixture comprising pyridine and isobutyric anhydride, adding finely-divided iron to the reaction mixture, diluting the reaction mixture with acetic acid, adding an additional amount of finely-divided iron to the diluted mixture, refluxing the resulting mixture, rendering the reaction mixture alkaline, and separating 4-isobutyl pyridine from the alkaline mixture.

11. Process for the production of 4-ethyl pyridine, which comprises forming a reaction mixture comprising pyridine and acetic anhydride, adding from 1.2 to 1.5 mols of finely-divided iron to the reaction mixture for each mol of pyridine, diluting the reaction mixture with acetic acid, adding an additional 0.8 to 1.5 mols of finely-divided iron to the diluted mixture, refluxing the resulting mixture, rendering the reaction mixture alkaline, and separating 4-ethyl pyridine from the alkaline mixture.

12. Process for the production of 4-ethyl pyridine, which comprises forming a reaction mixture comprising pyridine and 5 to 8 mols of acetic anhydride for each mol of pyridine, adding from 1.2 to 1.5 mols of finely-divided iron to the reaction mixture for each mol of pyridine, diluting the reaction mixture with acetic acid, adding an additional 0.8 to 1.5 mols of finely-divided iron to the diluted mixture, refluxing the resulting mixture, rendering the reaction mixture alkaline, and separating 4-ethyl pyridine from the alkaline mixture.

13. Process for the production of 4-ethyl pyridine, which comprises forming a reaction mixture comprising pyridine and 5 to 8 mols of acetic anhydride for each mol of pyridine, adding from 1.2 to 1.5 mols of finely-divided iron to the reaction mixture for each mol of pyridine, and maintaining the reaction temperature at 25 to 100° C., diluting the reaction mixture with acetic acid, adding an additional 0.8 to 1.5 mols of finely-divided iron to the diluted mixture, refluxing the resulting mixture, rendering the reaction mixture alkaline, and separating 4-ethyl pyridine from the alkaline mixture by steam distilling the alkaline reaction mixture to remove the pyridine compounds, and then fractionating the mixture obtained to separate 4-ethyl pyridine.

References Cited in the file of this patent

UNITED STATES PATENTS

| | | |
|---|---|---|
| 2,184,235 | Groll et al. | Dec. 19, 1939 |
| 2,413,598 | Ballard | Dec. 31, 1946 |

OTHER REFERENCES

Frank et al.: "Organic Syntheses," vol. 27, pp. 38–40 (1947).

Chem. Abstracts, vol. 35, cols. 5894–95 (1941).

Wibaut et al.: Rec. trav. chim., vol. 60, pp. 119–137 (1941).

Wibaut et al.: Rec. trav. chim., vol. 61, pp. 59–68 (1942).

Wibaut et al.: Rec. trav. chim., vol. 67, pp. 545–50 (1948).

Handbook of Chemistry and Physics, 30th ed., pp. 1439–40 (1947).